United States Patent
Speier et al.

(10) Patent No.: US 12,093,164 B1
(45) Date of Patent: Sep. 17, 2024

(54) EFFICIENTLY REPLACING SOFTWARE BREAKPOINT INSTRUCTIONS IN PROCESSOR-BASED DEVICES

(71) Applicant: Microsoft Technology Licensing, LLC, Redmond, WA (US)

(72) Inventors: Thomas Philip Speier, Wake Forest, NC (US); Leslie Mark Debruyne, Raleigh, NC (US); Pedro M. Teixeira, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/113,897

(22) Filed: Feb. 24, 2023

(51) Int. Cl.
*G06F 11/36* (2006.01)

(52) U.S. Cl.
CPC .............................. *G06F 11/3632* (2013.01)

(58) Field of Classification Search
None
See application file for complete search history.

(56) References Cited

U.S. PATENT DOCUMENTS

| | | | |
|---|---|---|---|
| 5,946,673 A * | 8/1999 | Francone | G06N 20/00 |
| | | | 706/13 |
| 6,026,501 A | 2/2000 | Hohl | |
| 2003/0005415 A1 * | 1/2003 | Bates | G06F 11/362 |
| | | | 717/129 |
| 2004/0040013 A1 | 2/2004 | Kalra | |
| 2011/0225394 A1 * | 9/2011 | Mital | G06F 15/167 |
| | | | 712/205 |
| 2012/0266144 A1 * | 10/2012 | Halliday | G06F 11/3632 |
| | | | 717/129 |

(Continued)

FOREIGN PATENT DOCUMENTS

| | | | |
|---|---|---|---|
| CN | 117707969 A | * | 3/2024 |
| GB | 2380831 A | | 4/2003 |
| GB | 2487575 A | | 8/2012 |

OTHER PUBLICATIONS

International Search Report and Written Opinion received for PCT Application No. PCT/US2024/016414, Jun. 12, 2024, 14 pages.

*Primary Examiner* — Philip Wang
(74) *Attorney, Agent, or Firm* — Withrow & Terranova, PLLC (57) ABSTRACT

Efficiently replacing software breakpoint instructions in processor-based devices is disclosed. In this regard, in one exemplary embodiment, a processor-based device is provided. The processor-based device comprises a system memory and a processor. The processor comprises a breakpoint slip register (BSR) configured to store an instruction of a software process that was replaced in the system memory by a software breakpoint instruction, and further comprises a breakpoint slip enable (BSE) indicator. The processor is configured to, during execution of the software process, execute the software breakpoint instruction. The processor is further configured to, responsive to executing the software breakpoint instruction, transfer program control to a debugger. The processor is also configured to, upon program control returning from the debugger, determine that the BSE indicator is set. The processor is additionally configured to, responsive to determining that the BSE indicator is set, execute the instruction stored in the BSR.

20 Claims, 5 Drawing Sheets

(56) References Cited

U.S. PATENT DOCUMENTS

| | | | |
|---|---|---|---|
| 2014/0298106 A1* | 10/2014 | Konigsburg | G06F 11/3636 |
| | | | 714/38.13 |
| 2015/0363198 A1* | 12/2015 | Yang | G06F 8/53 |
| | | | 717/106 |
| 2017/0249230 A1* | 8/2017 | Tsirkin | G06F 9/45558 |
| 2020/0142806 A1* | 5/2020 | Zbiciak | G06F 11/3636 |
| 2024/0069958 A1* | 2/2024 | Hornung | G06F 11/3648 |

\* cited by examiner

EFFICIENTLY REPLACING SOFTWARE BREAKPOINT INSTRUCTIONS IN PROCESSOR-BASED DEVICES

FIELD OF THE DISCLOSURE

The technology of the disclosure relates to debugging in processor-based devices and, more particularly, to the handling of software breakpoint instructions during debugging.

BACKGROUND

Instruction set architectures (ISAs), on which conventional processor-based devices are based, provide software breakpoint instructions that may be used during debugging of software processes. To debug a software process, a developer tool known as a debugger attaches to a target software process in system memory and provides functionality for controlling program flow and inspecting the internal state of the target software process. Software breakpoint instructions may be used by the debugger to halt execution of the target software process at a specified point (i.e., at a given program counter (PC) within the target software process). To accomplish this during a debugging session, the debugger replaces an instruction in the system memory at the specified point with a software breakpoint instruction. When the processor executes the software breakpoint instruction, an exception is raised, which halts execution of the target software process and causes program control to be transferred to the debugger.

The debugger may subsequently resume execution of the target software process at the point at which execution was halted by the software breakpoint instruction. This requires the debugger to perform a sequence of operations to replace the software breakpoint instruction in the system memory with the original instruction, and perform cache maintenance and synchronization operations to ensure that the original instruction is properly observed by all caches and processor cores within the processor-based device. The debugger may also configure the processor to re-enter debugging at a next instruction following the software breakpoint instruction, which entails replacing the next instruction with another software breakpoint instruction and performing further cache maintenance and synchronization operations to ensure that the newly inserted software breakpoint instruction is properly observed by all caches and processor cores within the processor-based device. Finally, the debugger executes an ISA-specific instruction to return program control to the software process and execute the original instruction.

However, there are disadvantages associated with this conventional approach to handling software breakpoint instructions. The operations described above for performing cache maintenance and synchronization every time an instruction in the system memory is replaced with a software breakpoint instruction (or vice versa) may incur significant latency, which negatively impacts processor performance. Moreover, there exists a risk that another processor thread executing on the processor-based device may not observe the software breakpoint instruction while the debugger is performing the operations described above. To mitigate this risk, the debugger may halt all thread of execution while performing the operations, which further degrades processor performance.

Accordingly, a more efficient mechanism for handling software breakpoint instructions during debugging is desirable.

SUMMARY

Exemplary embodiments disclosed herein include efficiently replacing software breakpoint instructions in processor-based devices. In this regard, in one exemplary embodiment, a processor of a processor-based device comprises a breakpoint slip register (BSR) in which an instruction that is replaced in a system memory with a software breakpoint instruction by a debugger can be stored. The processor further comprises a breakpoint slip enable (BSE) indicator, which is a state bit that informs the processor to execute the instruction stored in the BSR instead of the instruction at the location to which program control returns from the debugger (e.g., the program counter (PC) of the software breakpoint instruction). In exemplary operation, the processor executes the software breakpoint instruction during execution of a software process in the system memory, which causes the processor to transfer program control to a debugger. When program control returns from the debugger, the processor determines that the BSE indicator of the processor is set. In response, the processor executes the instruction stored in the BSR, instead of the instruction at the PC to which program control returns from the debugger. Some embodiments may provide that the processor provides a plurality of BSRs that store a corresponding plurality of instructions. In such embodiments, the processor may be configured to execute the plurality of instructions stored in the plurality of BSRs prior to executing a next instruction following the software breakpoint instruction in the system memory.

According to some embodiments, when program control is transferred to the debugger, the debugger stores an instruction of the software process (i.e., the original instruction replaced by the software breakpoint instruction) in the BSR of the processor. The debugger then sets the BSE indicator, and, on completion of debugging tasks, returns program control to the PC of the software breakpoint instruction (e.g., by executing an instruction set architecture (ISA)-specific instruction). According to some embodiments, the processor may clear the BSE indicator subsequent to execution of the instruction stored in the BSR (or, in embodiments in which multiple BSRs are provided, after execution of the instruction stored in the final BSR). Some embodiments may provide that the processor determines that an exception was raised as a result of execution of the instruction stored in the BSR. In response to determining that the exception was raised, the processor sets a BSR exception indicator, and transfers program control to an exception handler. The exception handler determines that the BSR exception indicator is set, obtains the instruction from the BSR, and then performs exception handling for the exception based on the instruction. Embodiments in which multiple BSRs are provided may provide that a BSR pointer, which points to a BSR and is advanced on execution of each instruction stored in each BSR, is used by the exception handler to obtain the instruction, because the BSR pointer would indicate which BSR stores the instruction that raised the exception. In some embodiments, the processor may continue execution of the software process at the next instruction following the software breakpoint instruction in the system memory, subsequent to execution of the instruction stored in the BSR.

In another exemplary embodiment, a processor-based device is provided. The processor-based device comprises a system memory and a processor. The processor comprises a BSR configured to store an instruction of a software process that was replaced in the system memory by a software breakpoint instruction, and further comprises a BSE indicator. The processor is configured to, during execution of the software process, execute the software breakpoint instruction. The processor is further configured to, responsive to executing the software breakpoint instruction, transfer program control to a debugger. The processor is also configured to, upon program control returning from the debugger, determine that the BSE indicator is set. The processor is additionally configured to, responsive to determining that the BSE indicator is set, execute the instruction stored in the BSR.

In another exemplary embodiment, a method for efficiently replacing software breakpoint instructions in processor-based devices is provided. The method comprises executing, by a processor of a processor-based device, a software breakpoint instruction during execution of a software process in a system memory. The method further comprises, responsive to executing the software breakpoint instruction, transferring, by the processor, program control to a debugger. The method also comprises, upon program control returning from the debugger, determining, by the processor, that a BSE indicator of the processor is set. The method additionally comprises, responsive to determining that the BSE indicator is set, executing, by the processor, an instruction stored in a BSR of the processor, wherein the instruction comprises an instruction of the software process that was replaced in the system memory by the software breakpoint instruction.

In another exemplary embodiment, a non-transitory computer-readable medium is provided. The computer-readable memory stores thereon an instruction program comprising a plurality of computer-executable instructions for execution by a processor of a processor-based device. The computer-executable instructions, when executed the processor, cause the processor to execute a software breakpoint instruction during execution of a software process in a system memory. The computer-executable instructions further cause the processor to, responsive to executing the software breakpoint instruction, transfer program control to a debugger. The computer-executable instructions also cause the processor to, upon program control returning from the debugger, determine that a BSE indicator of the processor is set. The computer-executable instructions additionally cause the processor to, responsive to determining that the BSE indicator is set, execute an instruction stored in a BSR of the processor, wherein the instruction comprises an instruction of the software process that was replaced in the system memory by the software breakpoint instruction.

Those skilled in the art will appreciate the scope of the present disclosure and realize additional embodiments thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several embodiments of the disclosure, and together with the description serve to explain the principles of the disclosure.

DETAILED DESCRIPTION

Exemplary embodiments disclosed herein include efficiently replacing software breakpoint instructions in processor-based devices. In this regard, in one exemplary embodiment, a processor of a processor-based device comprises a breakpoint slip register (BSR) in which an instruction that is replaced in a system memory with a software breakpoint instruction by a debugger can be stored. The processor further comprises a breakpoint slip enable (BSE) indicator, which is a state bit that informs the processor to execute the instruction stored in the BSR instead of the instruction at the location to which program control returns from the debugger (e.g., the program counter (PC) of the software breakpoint instruction). In exemplary operation, the processor executes the software breakpoint instruction during execution of a software process in the system memory, which causes the processor to transfer program control to a debugger. When program control returns from the debugger, the processor determines that the BSE indicator of the processor is set. In response, the processor executes the instruction stored in the BSR, instead of the instruction at the PC to which program control returns from the debugger. Some embodiments may provide that the processor provides a plurality of BSRs that store a corresponding plurality of instructions. In such embodiments, the processor may be configured to execute the plurality of instructions stored in the plurality of BSRs prior to executing a next instruction following the software breakpoint instruction in the system memory.

According to some embodiments, when program control is transferred to the debugger, the debugger stores an instruction of the software process (i.e., the original instruction replaced by the software breakpoint instruction) in the BSR of the processor. The debugger then sets the BSE indicator, and, on completion of debugging tasks, returns program control to the PC of the software breakpoint instruction (e.g., by executing an instruction set architecture (ISA)-specific instruction). According to some embodiments, the processor may clear the BSE indicator subsequent to execution of the instruction stored in the BSR (or, in embodiments in which multiple BSRs are provided, after execution of the instruction stored in the final BSR). Some embodiments may provide that the processor determines that an exception was raised as a result of execution of the instruction stored in the BSR. In response to determining that the exception was raised, the processor sets a BSR exception indicator, and transfers program control to an exception handler. The exception handler determines that the BSR exception indicator is set, obtains the instruction from the BSR, and then performs exception handling for the exception based on the instruction. Embodiments in which multiple BSRs are provided may provide that a BSR pointer, which points to a BSR and is advanced on execution of each instruction stored in each BSR, is used by the exception handler to obtain the instruction, because the BSR pointer would indicate which BSR stores the instruction that raised the exception. In some embodiments, the processor may continue execution of the software process at the next instruction following the software breakpoint instruction in the system memory, subsequent to execution of the instruction stored in the BSR.

Figure 1:
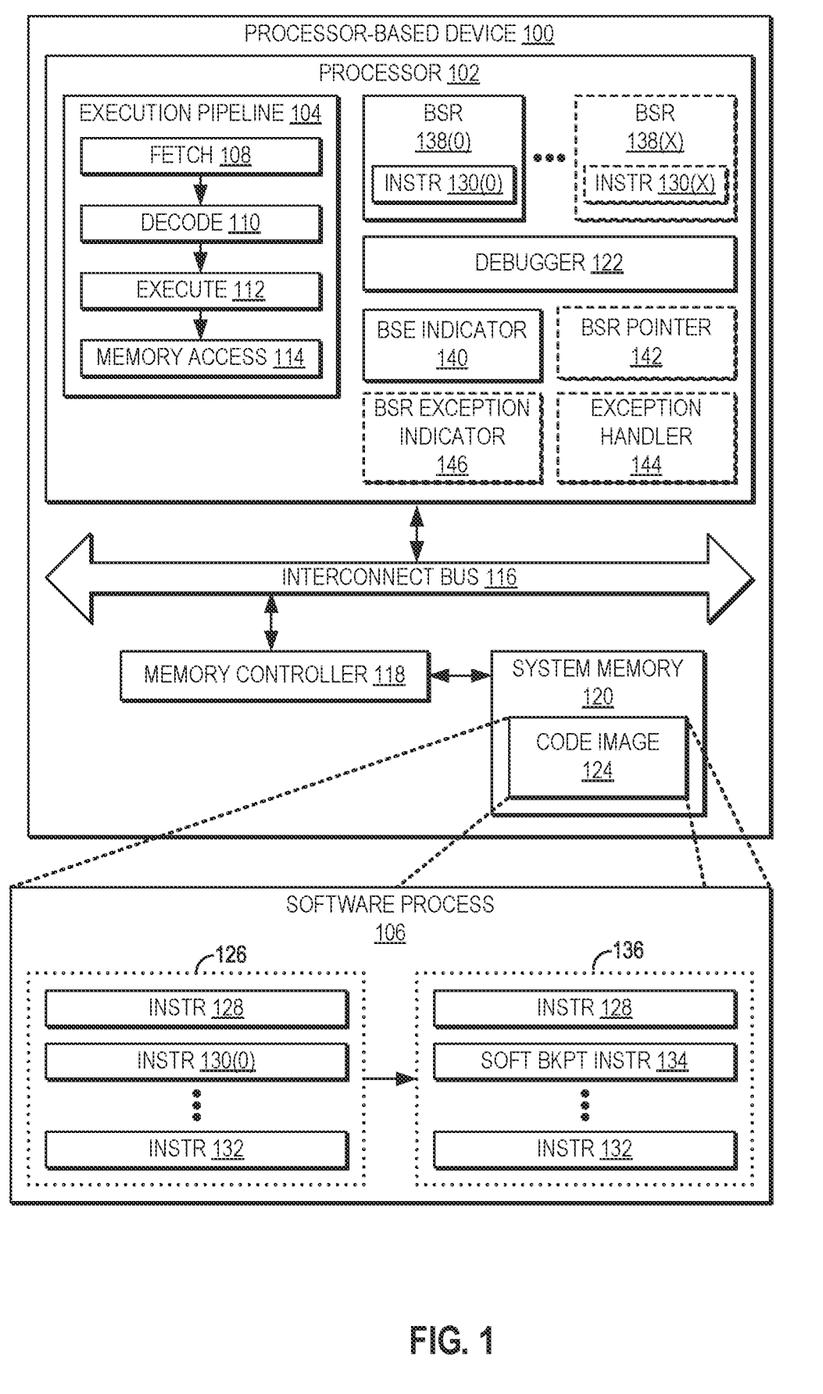
FIG. 1 is a block diagram of an exemplary processor-based device that includes a processor for efficiently replacing software breakpoint instructions, according to some exemplary embodiments.

In this regard, FIG. 1 illustrates an exemplary processor-based device 100 that provides a processor 102 for efficiently replacing software breakpoint instructions. The processor 102 may comprise a central processing unit (CPU) having one or more processor cores (not shown), and in some exemplary embodiments may be one of a plurality of similarly configured processors (not shown) of the processor-based device 100. The processor 102 of FIG. 1 includes an execution pipeline 104 that comprises circuitry configured to execute an instruction stream of computer-executable instructions of an executing software process 106. In the example of FIG. 1, the execution pipeline 104 includes a fetch stage (captioned as "FETCH" in FIG. 1) 108 for retrieving instructions for execution, a decode stage (captioned as "DECODE" in FIG. 1) 110 for translating fetched instructions into control signals for instruction execution, an execute stage (captioned as "EXECUTE" in FIG. 1) 112 for actually performing instruction execution, and a memory access stage (captioned as "MEMORY ACCESS" in FIG. 1) 114 for carrying out memory access operations (e.g., memory load operations and/or memory store operations) resulting from instruction execution. It is to be understood that, in some embodiments, the execution pipeline 104 may include fewer or more stages than those illustrated in the example of FIG. 1.

In the example of FIG. 1, the processor 102 is communicatively coupled to an interconnect bus 116, which in some embodiments may include additional constituent elements (e.g., a bus controller circuit and/or an arbitration circuit, as non-limiting examples) that are not shown in FIG. 1 for the sake of clarity. The processor 102 is also communicatively coupled, via the interconnect bus 116, to a memory controller 118 that controls access to a system memory 120 and manages the flow of data to and from the system memory 120. The system memory 120 provides addressable memory used for data storage by the processor-based device 100, and as such may comprise synchronous dynamic random access memory (SDRAM), as a non-limiting example.

The processor-based device 100 of FIG. 1 may encompass any one of known digital logic elements, semiconductor circuits, processing cores, and/or memory structures, among other elements, or combinations thereof. Embodiments described herein are not restricted to any particular arrangement of elements, and the disclosed techniques may be easily extended to various structures and layouts on semiconductor sockets or packages. It is to be understood that some embodiments of the processor-based device 100 may include more or fewer elements than illustrated in FIG. 1. For example, the processor 102 may further include more or fewer memory devices execution pipeline stages, controller circuits, registers, buffers, and/or caches.

To facilitate debugging of software processes such as the software process 106, the processor 102 of FIG. 1 executes a debugger 122. The debugger 122 in some embodiments comprises software that may coordinate with other hardware or software elements, such as a debugging agent (not shown), for providing functionality such as setting breakpoints, performing stepwise execution of instructions within the software process 106, observing the internal state of the software process 106 and/or the processor 102, and/or performing memory access operations to the system memory 120. During a debugging session, the debugger 122 may replace an instruction in the system memory 120 with a software breakpoint instruction that will halt execution of the software process 106 and cause program control to be transferred to the debugger 122. For instance, in the example of FIG. 1, a code image 124 of the software process 106 in the system memory 120 (to which the debugger 122 attaches to perform debugging) begins in an initial state 126 that includes an instruction (captioned as "INSTR" in FIG. 1) 128, an instruction (captioned as "INSTR" in FIG. 1) 130(0), and an instruction (captioned as "INSTR" in FIG. 1) 132. To halt execution of the software process 106 at the instruction 130(0), the debugger 122 replaces the instruction 130(0) with a software breakpoint instruction (captioned as "SOFT BKPT INSTR" in FIG. 1) 134, resulting in a modified state 136. When the software breakpoint instruction 134 is executed by the processor 102, an exception (not shown) is raised, and program control is transferred to the debugger 122.

The debugger may subsequently resume execution of the software process 106 at the point at which execution was halted by the software breakpoint instruction 134 (i.e., at the PC of the software breakpoint instruction 134). As noted above, this requires the debugger 122 to perform a sequence of operations to replace the software breakpoint instruction 134 in the system memory 120 with the original instruction 130(0), and perform cache maintenance and synchronization operations to ensure that the original instruction 130(0) is properly observed by all caches and processor cores of the processor-based device 100. However, this approach may incur significant latency and negatively impact processor performance, and may further require the halting of all threads of execution while these operations are performed.

Accordingly, the processor 102 of FIG. 1 provides a breakpoint slip register (BSR) 138(0) and a breakpoint slip enable (BSE) indicator (captioned as "BSE INDICATOR" in FIG. 1) 140. The BSR 138(0) comprises a register configured to store an instruction such as the instruction 130(0), while the BSE indicator 140 comprises a state bit that informs the processor 102 to execute the instruction stored in the BSR 138(0) instead of the instruction at the PC to which program control is returned from the debugger 122. Thus, in exemplary operation, the processor 102, while executing the software process 106, executes the software breakpoint instruction 134 in the system memory 120, resulting in an exception that causes the processor 102 to transfer program control to the debugger 122. In some embodiments, when program control is transferred to the debugger 122, the debugger 122 stores the instruction 130 (0) of the software process 106 (i.e., the original instruction replaced by the software breakpoint instruction 134) in the BSR 138(0) of the processor 102. The debugger 122 then sets the BSE indicator 140, and, on completion of debugging tasks, returns program control to the PC of the software breakpoint instruction 134 (e.g., by executing an ISA-specific instruction).

When program control returns from the debugger 122, the processor 102 determines that the BSE indicator 140 of the processor 102 is set, and, in response, executes the instruction 130(0) stored in the BSR 138(0). In some embodiments, the processor 102 may continue execution of the software process 106 at the next instruction 132 following the software breakpoint instruction 134 in the system memory 120, subsequent to execution of the instruction 130(0) stored in the BSR 138(0). Some embodiments may provide that the processor 102 comprises a plurality of BSRs 138(0)-138(X) that store a corresponding plurality of instructions 130(0)-130(X). In such embodiments, the processor 102 may be configured to execute the plurality of instructions 130(0)-130(X) stored in the plurality of BSRs 138(0)-138(X) prior to executing the next instruction 132 following the software breakpoint instruction 134 in the system memory 120. A BSR pointer 142 in such embodiments is configured to point to one of the BSRs 138(0)-138(X) to indicate an instruction among the plurality of instructions 130(0)-130(X) to execute, and is advanced to a next BSR among the BSRs 138(0)-138(X) upon completion of execution of each instruction among the plurality of instructions 130(0)-130(X). According to some embodiments, the processor 102 may also clear the BSE indicator 140 subsequent to execution of the instruction 130(0) stored in the BSR 138(0) (or, in embodiments in which multiple BSRs 138(0)-138(X) are provided, after execution of the instruction 130(X) stored in the final BSR 138(X) as indicated by the BSR pointer 142).

In some embodiments, if an exception occurs when executing an instruction, an exception handler 144 may need to identify the specific instruction that caused the exception to determine how to handle the exception. Such embodiments may provide that the processor 102 further comprises a BSR exception indicator 146 to indicate that an exception resulted from execution of an instruction stored in, e.g., the BSR 138(0). Thus, in such embodiments, the processor 102 may determines that an exception was raised as a result of execution of the instruction 130(0) stored in the BSR 138(0). In response to determining that the exception was raised, the processor 102 sets the BSR exception indicator 146, and then transfers program control to the exception handler 144. The exception handler 144 determines that the BSR exception indicator 146 is set, and, based on the determination, obtains the instruction 130(0) from the BSR 138(0) and performs exception handling for the exception based on the instruction 130(0). In embodiments in which multiple BSRs 138(0)-138(X) are provided, the exception handler 144 may use the BSR pointer 142 to determine which of the instructions 130(0)-130(X) raised the exception, and to determine from which BSR 138(0)-138(X) to obtain the corresponding instruction 130(0)-130(X).

Figure 2A:
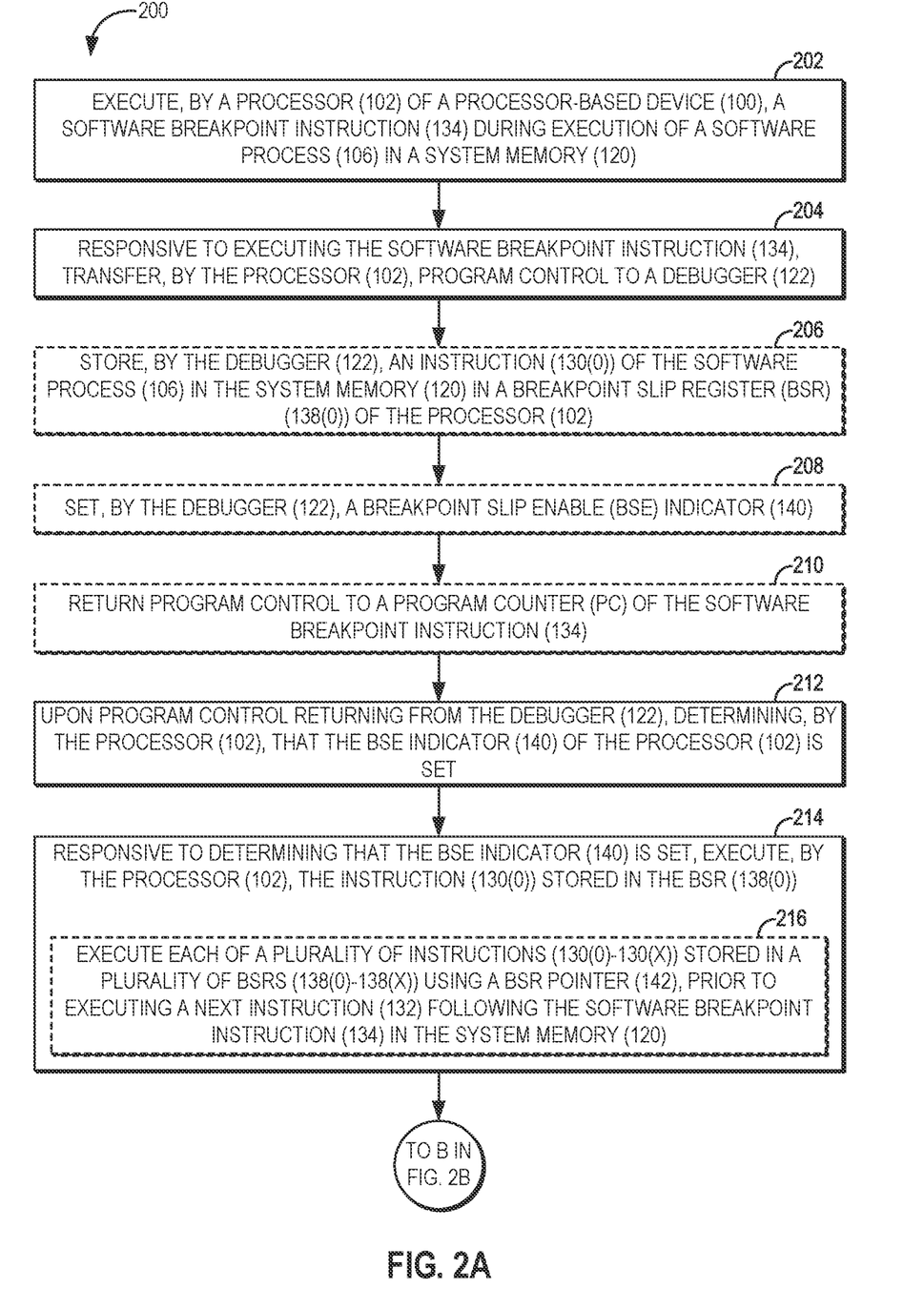
FIGS. 2A-2C are flowcharts illustrating exemplary operations for efficiently replacing software breakpoint instructions by the processor-based device of FIG. 1.
Figure 2B:
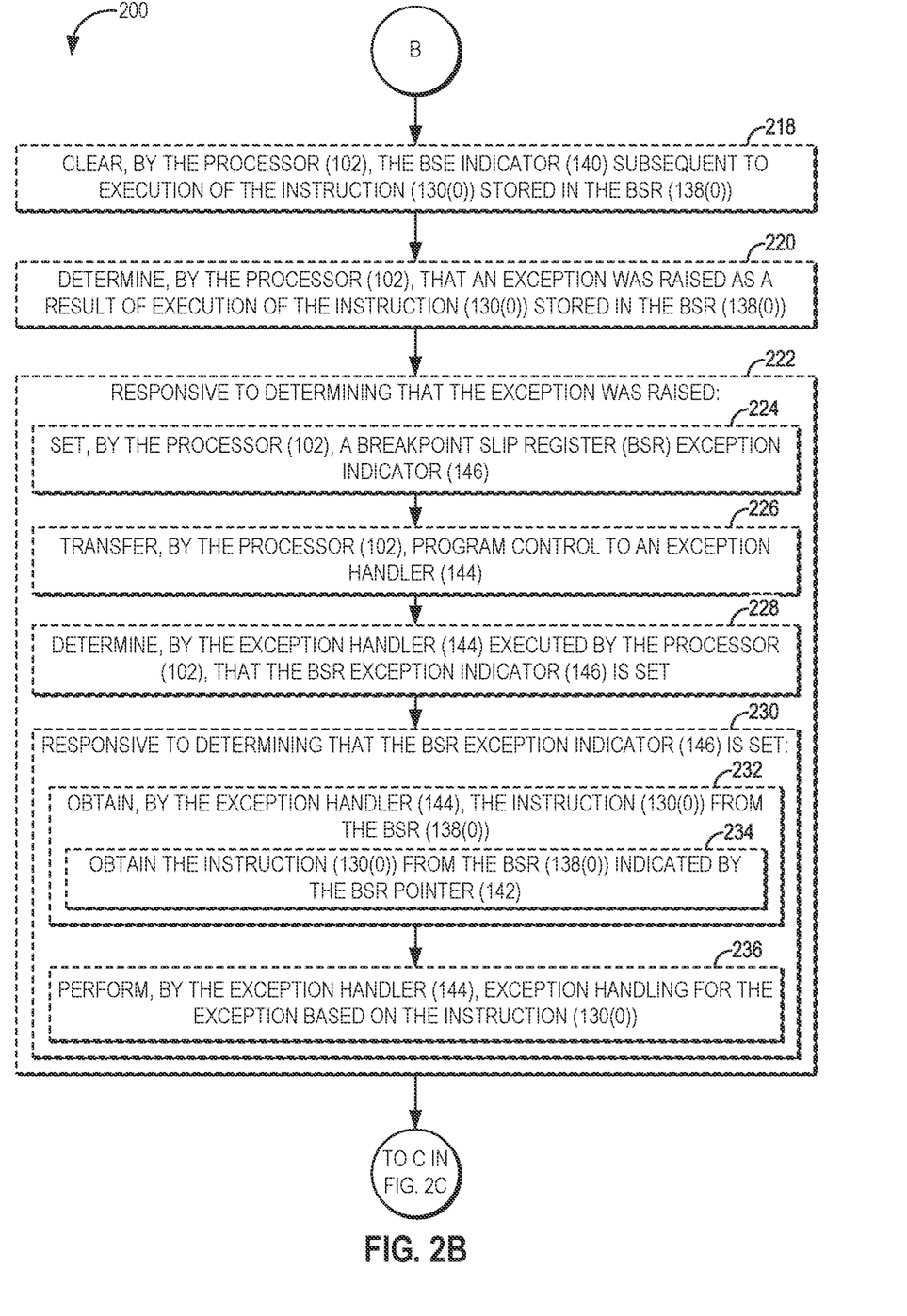
Figure 2C:
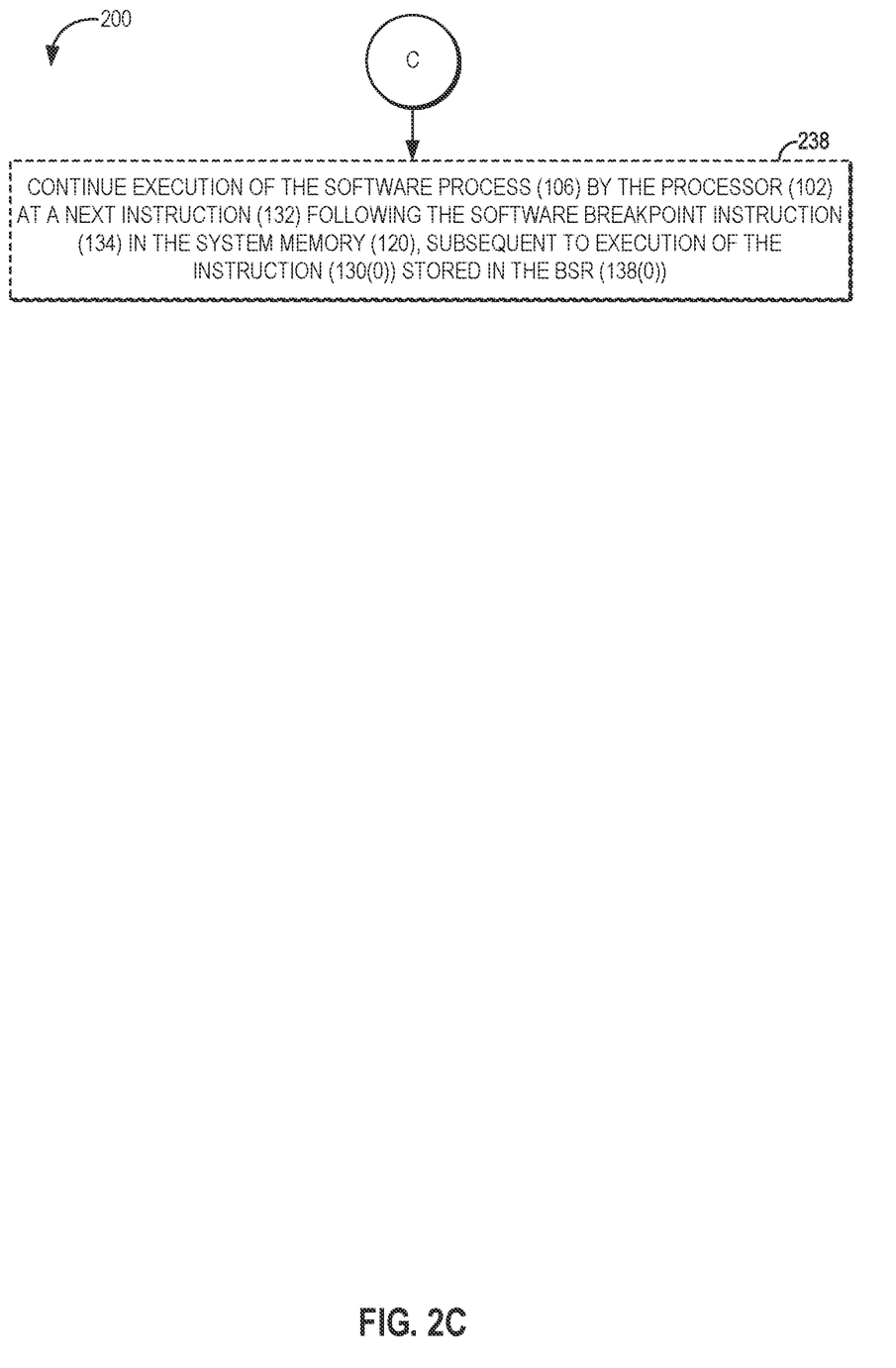

FIGS. 2A-2C illustrate exemplary operations 200 for efficiently replacing software breakpoint instructions by the processor-based device 100 of FIG. 1. For the sake of clarity, elements of FIG. 1 are referenced in describing FIGS. 2A-2C. The operations 200 in FIG. 2A, according to some embodiments, begin with a processor (e.g., the processor 102 of FIG. 1) executing a software breakpoint instruction (e.g., the software breakpoint instruction 134 of FIG. 1) during execution of a software process (e.g., the software process 106 of FIG. 1) in a system memory (e.g., the system memory 120 of FIG. 1) (block 202). In response to executing the software breakpoint instruction 134, the processor 102 transfers program control to a debugger, such as the debugger 122 of FIG. 1 (block 204). In some embodiments, the debugger 122 stores an instruction (e.g., the instruction 130(0) of FIG. 1) of the software process 106 in the system memory 120 in a BSR of the processor 102, such as the BSR 138(0) of FIG. 1 (block 206). The debugger 122 in such embodiments next sets a BSE indicator, such as the BSE indicator 140 of FIG. 1 (block 208). The debugger 122 then returns program control to a PC of the software breakpoint instruction 134 (e.g., by executing an ISA-specific instruction, as a non-limiting example) (block 210).

When program control returns from the debugger 122, the processor 102 determines that the BSE indicator 140 of the processor 102 is set (block 212). Responsive to determining that the BSE indicator 140 is set, the processor 102 executes the instruction 130(0) stored in the BSR 138(0) (block 214). In some embodiments (e.g., those in which the processor 102 provides a plurality of BSRs such as the BSRs 138(0)-138(X) of FIG. 1), the operations of block 214 for executing the instruction 130(0) stored in the BSR 138(0) may comprise executing each of a plurality of instructions (e.g., the instructions 130(0)-130(X) of FIG. 1) stored in the plurality of BSRs 138(0)-138(X) using a BSR pointer (e.g., the BSR pointer 142 of FIG. 1) prior to executing a next instruction (e.g., the next instruction 132 of FIG. 1) following the software breakpoint instruction 134 in the system memory 120 (block 216). For instance, the processor 102 may first configure the BSR pointer 142 to indicate the first BSR 138(0), and upon execution of the instruction 130(0) stored in the BSR 138(0), may configure the BSR pointer 142 to advance to the next BSR 138(1), and so on in like fashion until all of the instructions 130(0)-130(X) have executed. The operations 200 in some embodiments may then continue at block 218 of FIG. 2B.

Referring now to FIG. 2B, the exemplary operations 200 according to some embodiments may continue with the processor 102 clearing the BSE indicator 140 subsequent to execution of the instruction 130(0) stored in the BSR 138(0) (block 218). Some embodiments may provide that the processor 102 determines that an exception was raised as a result of execution of the instruction 130(0) stored in the BSR 138(0) (block 220). In response to determining that the exception was raised, the processor 102 performs a series of operations (block 222). The processor 102 sets a BSR exception indicator, such as the BSR exception indicator 146 of FIG. 1 (block 224). The processor 102 then transfers program control to an exception handler (e.g., the exception handler 144 of FIG. 1) (block 226). The exception handler 144 determines that the BSR exception indicator 146 is set (block 228). In response to determining that the BSR exception indicator 146 is set, the processor 102 performs a series of operations (block 230). The exception handler 144 obtains the instruction 130(0) from the BSR 138(0) (block 232). In embodiments in which multiple BSRs 138(0)-138(X) are provided, the operations of block 232 for obtaining the instruction 130(0) may comprise the exception handler 144 obtaining the instruction 130(0) from the BSR 138(0) indicated by the BSR pointer 142 (block 234). The exception handler 144 then performs exception handling for the exception based on the instruction 130(0) (block 236). The operations 200 in some embodiments may then continue at block 238 of FIG. 2C.

Turning now to FIG. 2C, the operations 200 according to some embodiments may comprise the processor 102 continuing execution of the software process 106 at the next instruction 132 following the software breakpoint instruction 134 in the system memory 120, subsequent to execution of the instruction 130(0) stored in the BSR 138(0) (block 238).

Figure 3:
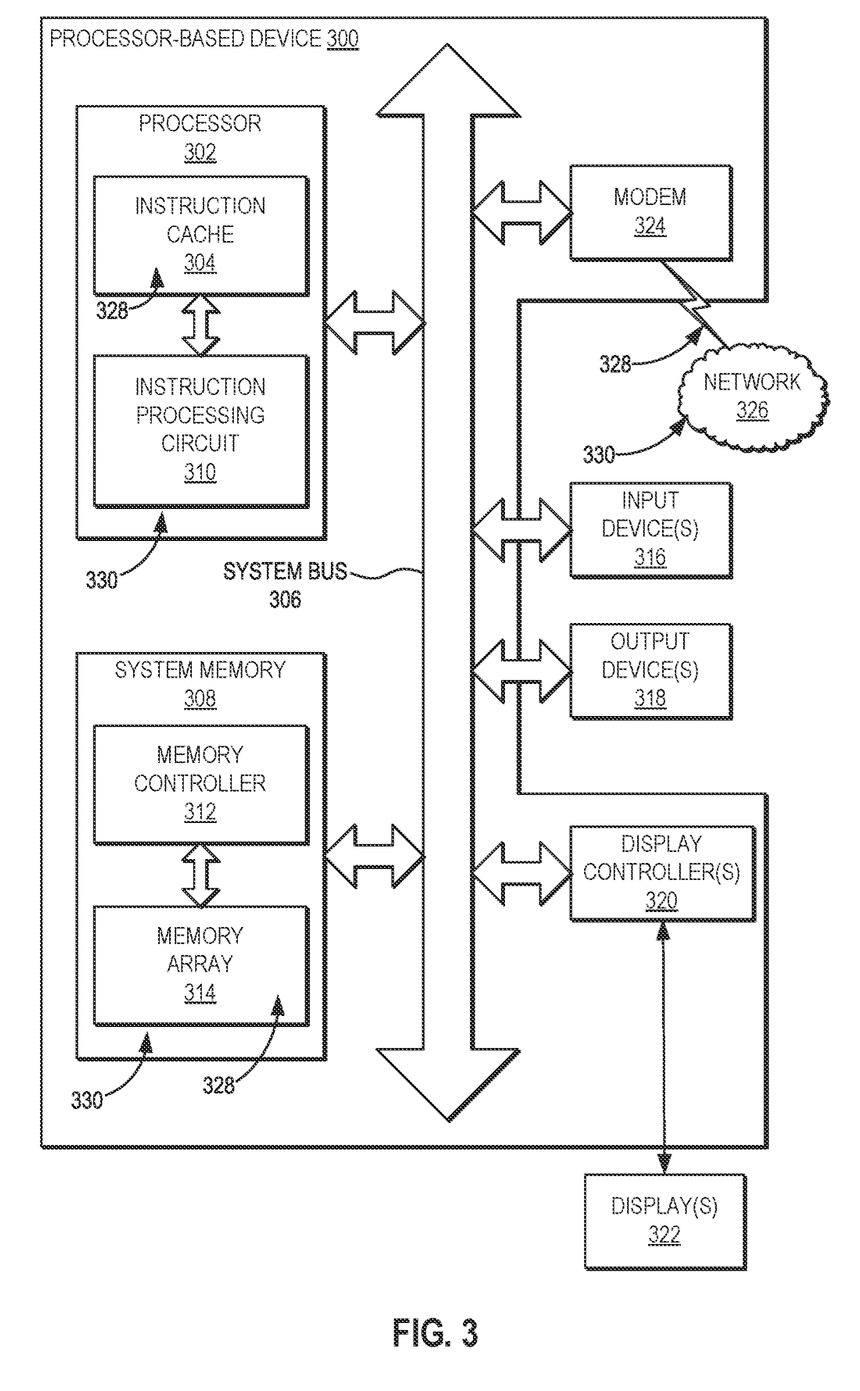
FIG. 3 is a block diagram of an exemplary processor-based device, such as the processor-based device of FIG. 1, that is configured to efficiently replace software breakpoint instructions, according to some exemplary embodiments.

FIG. 3 is a block diagram of an exemplary processor-based device 300, such as the processor-based device 100 of FIG. 1, that efficiently replaces software breakpoint instructions. The processor-based device 300 may be a circuit or circuits included in an electronic board card, such as, a printed circuit board (PCB), a server, a personal computer, a desktop computer, a laptop computer, a personal digital assistant (PDA), a computing pad, a mobile device, or any other device, and may represent, for example, a server or a user's computer. In this example, the processor-based device 300 includes a processor 302. The processor 302 represents one or more general-purpose processing circuits, such as a microprocessor, central processing unit, or the like, and may correspond to the processor 102 of FIG. 1. The processor 302 is configured to execute processing logic in instructions for performing the operations and steps discussed herein. In this example, the processor 302 includes an instruction cache 304 for temporary, fast access memory storage of instructions and an instruction processing circuit 310. Fetched or prefetched instructions from a memory, such as from a system memory 308 over a system bus 306, are stored in the instruction cache 304. The instruction processing circuit 310 is configured to process instructions fetched into the instruction cache 304 and process the instructions for execution.

The processor 302 and the system memory 308 are coupled to the system bus 306 (corresponding to the interconnect bus 116 of FIG. 1) and can intercouple peripheral devices included in the processor-based device 300. As is well known, the processor 302 communicates with these other devices by exchanging address, control, and data information over the system bus 306. For example, the processor 302 can communicate bus transaction requests to a memory controller 312 in the system memory 308 as an example of a peripheral device. Although not illustrated in FIG. 3, multiple system buses 306 could be provided, wherein each system bus constitutes a different fabric. In this example, the memory controller 312 is configured to provide memory access requests to a memory array 314 in the system memory 308. The memory array 314 is comprised of an array of storage bit cells for storing data. The system memory 308 may be a read-only memory (ROM), flash memory, dynamic random access memory (DRAM), such as synchronous DRAM (SDRAM), etc., and a static memory (e.g., flash memory, static random access memory (SRAM), etc.), as non-limiting examples.

Other devices can be connected to the system bus 306. As illustrated in FIG. 3, these devices can include the system memory 308, one or more input devices 316, one or more output devices 318, a modem 324, and one or more display controllers 320, as examples. The input device(s) 316 can include any type of input device, including, but not limited to, input keys, switches, voice processors, etc. The output device(s) 318 can include any type of output device, including, but not limited to, audio, video, other visual indicators, etc. The modem 324 can be any device configured to allow exchange of data to and from a network 326. The network 326 can be any type of network, including, but not limited to, a wired or wireless network, a private or public network, a local area network (LAN), a wireless local area network (WLAN), a wide area network (WAN), a BLUETOOTH™ network, and the Internet. The modem 324 can be configured to support any type of communications protocol desired. The processor 302 may also be configured to access the display controller(s) 320 over the system bus 306 to control information sent to one or more displays 322. The display(s) 322 can include any type of display, including, but not limited to, a cathode ray tube (CRT), a liquid crystal display (LCD), a plasma display, etc.

The processor-based device 300 in FIG. 3 may include a set of instructions 328 that may be encoded with the reach-based explicit consumer naming model to be executed by the processor 302 for any application desired according to the instructions. The instructions 328 may be stored in the system memory 308, processor 302, and/or instruction cache 304 as examples of non-transitory computer-readable medium 330. The instructions 328 may also reside, completely or at least partially, within the system memory 308 and/or within the processor 302 during their execution. The instructions 328 may further be transmitted or received over the network 326 via the modem 324, such that the network 326 includes the computer-readable medium 330.

While the computer-readable medium 330 is shown in an exemplary embodiment to be a single medium, the term "computer-readable medium" should be taken to include a single medium or multiple media (e.g., a centralized or distributed database, and/or associated caches and servers) that store the one or more sets of instructions 328. The term "computer-readable medium" shall also be taken to include any medium that is capable of storing, encoding, or carrying a set of instructions for execution by a processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.), and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A processor-based device, comprising:
    a system memory; and
    a processor comprising:
        a Breakpoint Slip Register (BSR) configured to store an instruction of a software process that was replaced in the system memory by a software breakpoint instruction; and
        a Breakpoint Slip Enable (BSE) indicator;
    the processor configured to, during execution of the software process:
        execute the software breakpoint instruction;
        responsive to executing the software breakpoint instruction, transfer program control to a debugger;
        upon program control returning from the debugger, determine that the BSE indicator is set; and
        responsive to determining that the BSE indicator is set, execute the instruction stored in the BSR.

2. The processor-based device of claim 1, wherein the processor is further configured to execute the debugger to, subsequent to transferring program control to the debugger:
    store the instruction in the BSR;
    set the BSE indicator; and
    return program control to a program counter (PC) of the software breakpoint instruction.

3. The processor-based device of claim 1, wherein the processor is further configured to clear the BSE indicator subsequent to execution of the instruction stored in the BSR.

4. The processor-based device of claim 1, wherein the processor is further configured to continue execution of the software process at a next instruction following the software breakpoint instruction in the system memory, subsequent to execution of the instruction stored in the BSR.

5. The processor-based device of claim 1, wherein:
    the processor further comprises a BSR exception indicator; and
    the processor is further configured to:
        determine that an exception was raised as a result of execution of the instruction stored in the BSR; and
        responsive to determining that the exception was raised:
            set the BSR exception indicator; and
            transfer program control to an exception handler.

6. The processor-based device of claim 5, wherein the processor is further configured to execute the exception handler to:
    determine that the BSR exception indicator is set; and
    responsive to determining that the BSR exception indicator is set:
        obtain the instruction from the BSR; and
        perform exception handling for the exception based on the instruction.

7. The processor-based device of claim 6, wherein:
    the BSR comprises one of a plurality of BSRs storing a corresponding plurality of instructions;

the processor further comprises a BSR pointer configured to indicate a BSR among the plurality of BSRs; and the processor is configured to obtain the instruction from the BSR by being configured to obtain the instruction from the BSR indicated by the BSR pointer.

8. The processor-based device of claim 1, wherein:

the BSR comprises one of a plurality of BSRs storing a corresponding plurality of instructions;

the processor further comprises a BSR pointer configured to indicate a BSR among the plurality of BSRs; and the processor is configured to execute the instruction stored in the BSR by being configured to execute each of the plurality of instructions stored in the plurality of BSRs using the BSR pointer, prior to executing a next instruction following the software breakpoint instruction in the system memory.

9. A method for efficiently replacing software breakpoint instructions, comprising:

executing, by a processor of a processor-based device, a software breakpoint instruction during execution of a software process in a system memory;

responsive to executing the software breakpoint instruction, transferring, by the processor, program control to a debugger;

upon program control returning from the debugger, determining, by the processor, that a Breakpoint Slip Enable (BSE) indicator of the processor is set; and responsive to determining that the BSE indicator is set, executing, by the processor, an instruction stored in a Breakpoint Slip Register (BSR) of the processor, wherein the instruction comprises an instruction of the software process that was replaced in the system memory by the software breakpoint instruction.

10. The method of claim 9, further comprising:

storing, by the debugger executed by the processor, the instruction in the BSR;

setting, by the debugger, the BSE indicator; and returning program control to a program counter (PC) of the software breakpoint instruction.

11. The method of claim 9, further comprising clearing, by the processor, the BSE indicator subsequent to execution of the instruction stored in the BSR.

12. The method of claim 9, further comprising continuing execution of the software process by the processor at a next instruction following the software breakpoint instruction in the system memory, subsequent to execution of the instruction stored in the BSR.

13. The method of claim 9, further comprising:

determining, by the processor, that an exception was raised as a result of execution of the instruction stored in the BSR; and responsive to determining that the exception was raised:

setting, by the processor, a BSR exception indicator; and transferring, by the processor, program control to an exception handler.

14. The method of claim 13, further comprising:

determining, by the exception handler executed by the processor, that the BSR exception indicator is set; and responsive to determining that the BSR exception indicator is set:

obtaining, by the exception handler, the instruction from the BSR; and performing, by the exception handler, exception handling for the exception based on the instruction.

15. The method of claim 14, wherein:

the BSR comprises one of a plurality of BSRs storing a corresponding plurality of instructions; and obtaining the instruction from the BSR comprises obtaining the instruction from the BSR indicated by a BSR pointer of the processor;

wherein the BSR is configured to indicate a BSR among the plurality of BSRs.

16. The method of claim 9, wherein:

the BSR comprises one of a plurality of BSRs storing a corresponding plurality of instructions; and executing the instruction stored in the BSR comprises executing each of the plurality of instructions stored in the plurality of BSRs using a BSR pointer of the processor, prior to executing a next instruction following the software breakpoint instruction in the system memory, wherein the BSR pointer is configured to indicate a BSR among the plurality of BSRs.

17. A non-transitory computer-readable medium having stored thereon an instruction program comprising a plurality of computer-executable instructions for execution by a processor of a processor-based device which, when executed by the processor, causes the processor to:

execute a software breakpoint instruction during execution of a software process in a system memory;

responsive to executing the software breakpoint instruction, transfer program control to a debugger;

upon program control returning from the debugger, determine that a Breakpoint Slip Enable (BSE) indicator of the processor is set; and responsive to determining that the BSE indicator is set, execute an instruction stored in a Breakpoint Slip Register (BSR) of the processor, wherein the instruction comprises an instruction of the software process that was replaced in the system memory by the software breakpoint instruction.

18. The non-transitory computer-readable medium of claim 17, wherein the plurality of computer-executable instructions further cause the processor to:

store, using the debugger executed by the processor, the instruction in the BSR;

set, using the debugger, the BSE indicator; and return program control to a program counter (PC) of the software breakpoint instruction.

19. The non-transitory computer-readable medium of claim 17, wherein the plurality of computer-executable instructions further cause the processor to clear the BSE indicator subsequent to execution of the instruction stored in the BSR.

20. The non-transitory computer-readable medium of claim 17, wherein the plurality of computer-executable instructions further cause the processor to continue execution of the software process at a next instruction following the software breakpoint instruction in the system memory, subsequent to execution of the instruction stored in the BSR.

* * * * *